(12) United States Patent
Kim et al.

(10) Patent No.: US 11,424,527 B2
(45) Date of Patent: Aug. 23, 2022

(54) ELECTRONIC DEVICE AND METHOD FOR PERFORMING WIRELESS COMMUNICATION WITH EXTERNAL ELECTRONIC DEVICE

(71) Applicant: Samsung Electronics Co., Ltd., Suwon-si (KR)

(72) Inventors: Yusu Kim, Suwon-si (KR); Juhyang Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 253 days.

(21) Appl. No.: 16/785,455

(22) Filed: Feb. 7, 2020

(65) Prior Publication Data
US 2020/0259249 A1    Aug. 13, 2020

(30) Foreign Application Priority Data
Feb. 8, 2019    (KR) .................... 10-2019-0015118

(51) Int. Cl.
*H02J 50/80* (2016.01)
*H01Q 1/24* (2006.01)
(Continued)

(52) U.S. Cl.
CPC .............. *H01Q 1/248* (2013.01); *H02J 7/02* (2013.01); *H02J 50/12* (2016.02); *H02J 50/80* (2016.02); *H04B 5/0093* (2013.01)

(58) Field of Classification Search
CPC ......... H01Q 1/248; H02J 50/80; H02J 50/12; H02J 7/02; H04B 5/0093
See application file for complete search history.

(56) References Cited

U.S. PATENT DOCUMENTS

| 7,181,164 B2 * | 2/2007 | Lee .......................... H04B 5/02 455/41.2 |
| 7,681,539 B2 | 3/2010 | Wineland et al. |

(Continued)

FOREIGN PATENT DOCUMENTS

| KR | 10-2016-0035530 A | 3/2016 |
| KR | 10-2016-0061228 A | 5/2016 |
| KR | 10-2018-0090433 A | 8/2018 |

OTHER PUBLICATIONS

Tao Qi, "Switch MST Technology", Oct. 31, 2017, 16 pages.
(Continued)

*Primary Examiner* — Dinh T Le

(57) ABSTRACT

An electronic device including: a battery; a signal converting circuit connected to the battery including first, second, third, and fourth switches of a bridge structure; a processor connected to the signal converting circuit; and an antenna connected to the signal converting circuit. The signal converting circuit is configured to: receive from the processor an input which selects a first communication scheme based on the received input while converting and providing to the antenna a direct current signal output from the battery to an alternate current signal; control the first and fourth switches to alternate in a high state and a low state; control the second and third switches in a different state which is different from the state of the first and fourth switches; and control two of the first, second, third, and fourth switches in the high state to alternate in an on state and an off state.

20 Claims, 10 Drawing Sheets

(51) Int. Cl.
*H04B 5/00* (2006.01)
*H02J 50/12* (2016.01)
*H02J 7/02* (2016.01)

(56) References Cited

U.S. PATENT DOCUMENTS

| | | |
|---|---|---|
| 9,876,536 B1 * | 1/2018 | Bell ................. H02J 50/40 |
| 10,045,398 B2 | 8/2018 | Nam et al. |
| 2013/0270924 A1 | 10/2013 | Mori et al. |
| 2015/0280429 A1 | 10/2015 | Makita et al. |
| 2016/0149416 A1 | 5/2016 | Ha et al. |
| 2018/0331726 A1 | 11/2018 | Ha et al. |
| 2019/0036372 A1 | 1/2019 | Wang |

OTHER PUBLICATIONS

International Search Report and Written Opinion of the International Searching Authority in connection with International Application No. PCT/KR2020/001719 dated May 29, 2020, 8 pages.

* cited by examiner

ELECTRONIC DEVICE AND METHOD FOR PERFORMING WIRELESS COMMUNICATION WITH EXTERNAL ELECTRONIC DEVICE

CROSS-REFERENCE TO RELATED APPLICATION

This application is based on and claims priority under 35 U.S.C. § 119 to Korean Patent Application No. 10-2019-0015118 filed on Feb. 8, 2019 in the Korean Intellectual Property Office, the disclosure of which is incorporated by reference herein in its entirety.

BACKGROUND

1. Field

The disclosure relates generally to an electronic device for performing wireless communication with an external electronic and its operating method.

2. Description of Related Art

An electronic device may perform wireless communication with an external electronic device over an antenna (e.g., a coil). Such an electronic device may include a plurality of antennas to support different communication schemes. For example, the different communication schemes may include a communication scheme for wirelessly transmitting and receiving power, and a communication scheme for wirelessly transmitting and receiving data.

The electronic device is being developed to support a plurality of communication schemes with the external electronic device. Accordingly, the electronic device may include a plurality of antennas to support the plurality of the communication schemes. However, for the plurality of the antennas in the electronic device, it may demand efforts to optimally dispose the antennas in a limited mounting area of the electronic device. In addition, with the plurality of the antennas in the electronic device, a manufacturing cost of the electronic device may increase compared to a single antenna. Hence, what is demanded is a method for supporting a plurality of communication schemes using a single antenna.

The technical objects of the present disclosure are not limited to the technical objects as discussed above, and other technical objects which are not mentioned herein will be apparent to those skilled in the art from the following description.

SUMMARY

An electronic device according to an embodiment may include a battery, a signal converting circuit electrically connected to the battery, transmitting and receiving a direct current signal to and from the battery, and including first, second, third, and fourth switches of a bridge structure, a processor electrically connected to the signal converting circuit, and an antenna electrically connected to the signal converting circuit, transmitting and receiving an alternate current signal to and from the signal converting circuit, and supporting a plurality of communication schemes, wherein the signal converting circuit may be configured to receive from the processor, an input which selects a first communication scheme from the plurality of the communication schemes, based on the received input, while converting and providing to the antenna, a direct current signal outputted from the battery to an alternate current signal, control to alternate the first and fourth switches in a high state and a low state at intervals according to the first communication scheme, control the second and third switches in a different state, which is the high state or the low state, from the state of the first and fourth switches, and control to alternate two of the first, second, third, and fourth switches, the two of the high state, in an on state and an off state at designated intervals.

An operating method of an electronic device according to an embodiment may include receiving, at a processor of the electronic device, an input which selects a first communication scheme from a plurality of communication schemes, and based on the input which selects the first communication scheme from the plurality of the communication schemes, converting and providing, at a signal converting circuit including first, second, third, and fourth switches of a bridge structure of the electronic device, to an antenna of the electronic device, a direct current signal outputted from a battery of the electronic device to an alternate current signal, wherein converting and providing to the antenna of the electronic device, the direct current signal outputted from the battery of the electronic device to the alternate current signal may include controlling, at the signal converting circuit, to alternate the first and fourth switches in a high state and a low state at intervals according to the first communication scheme, controlling, at the signal converting circuit, the second and third switches in a different state, which is the high state or the low state, from the state of the first and fourth switches, and controlling, at the signal converting circuit, to alternate two of the first, second, third, and fourth switches, the two in the high state, in an on state and an off state at designated intervals.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
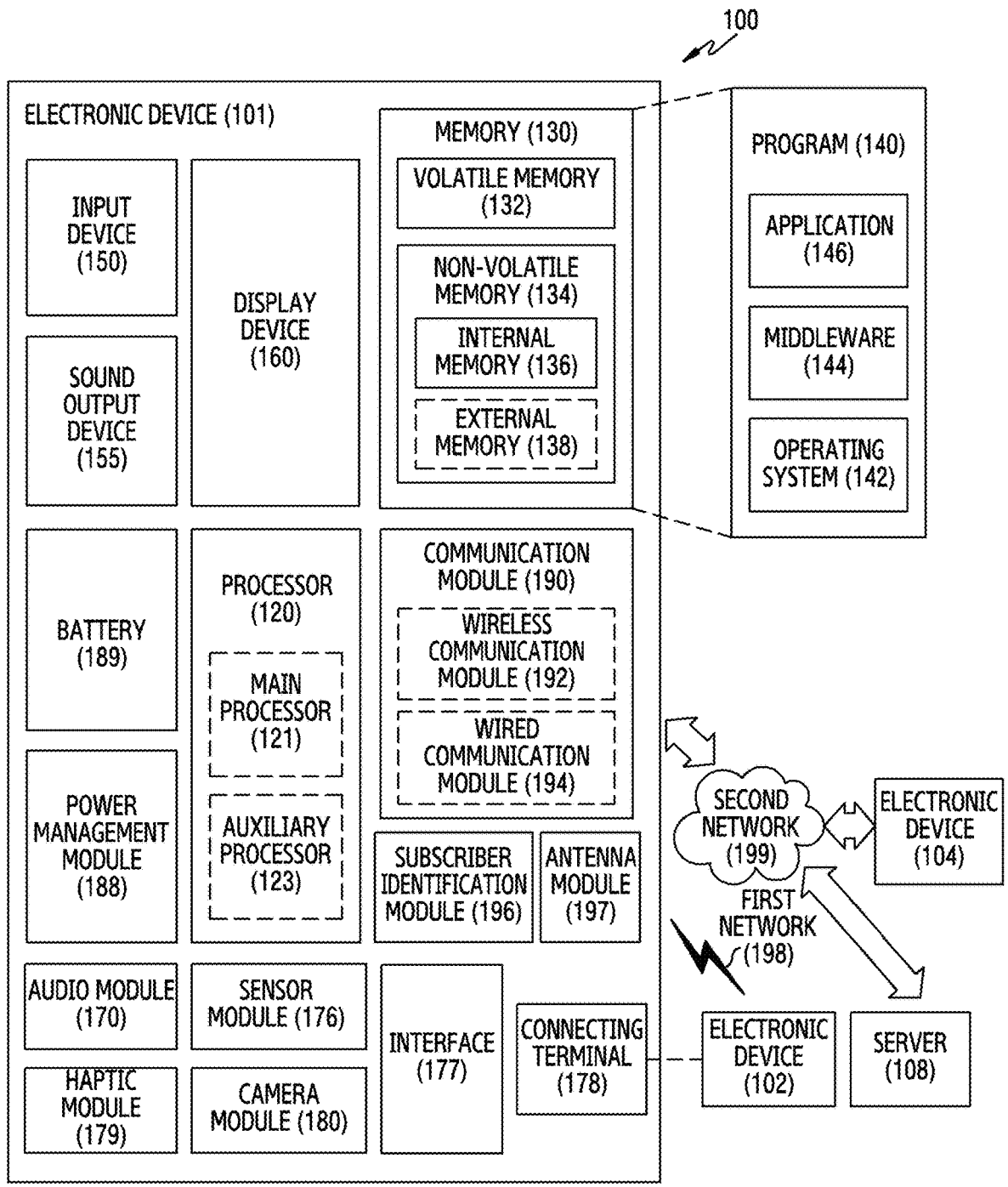
FIG. 1 illustrates a block diagram of an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to an embodiment may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2:
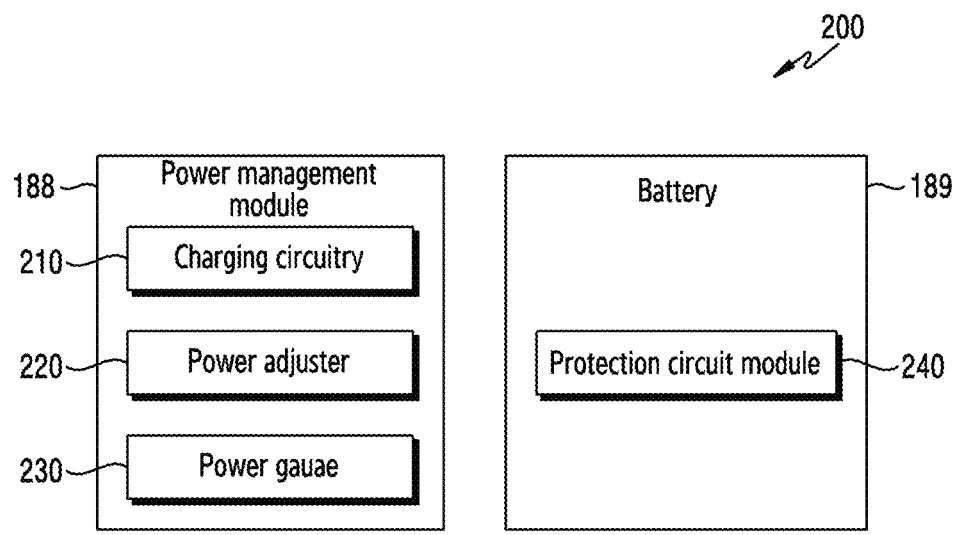
FIG. 2 illustrates a block diagram of a power management module and a battery of an electronic device according to an embodiment.

FIG. 2 is a block diagram 200 illustrating the power management module 188 and the battery 189 according to various embodiments. Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
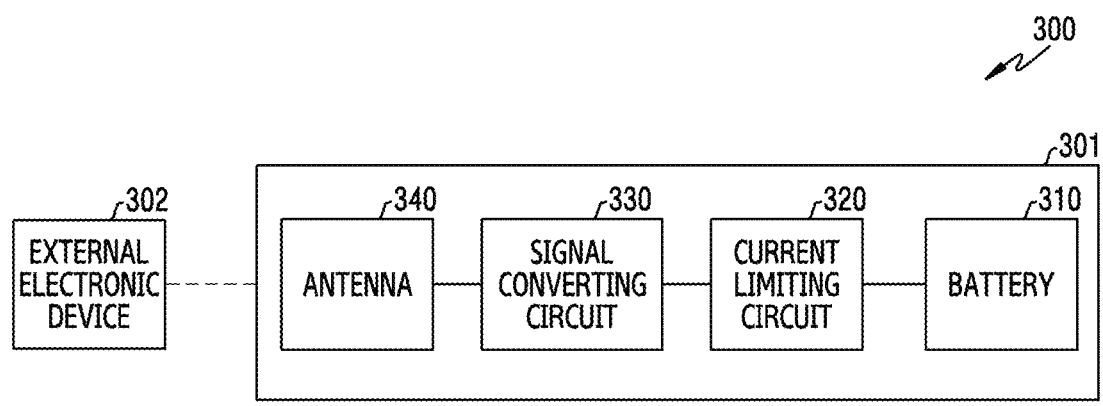
FIG. 3 illustrates a diagram of an example of a functional configuration of an electronic device according to an embodiment.

FIG. 3 illustrates a diagram 300 of an example of a functional configuration of an electronic device 301 according to an embodiment. The functional configuration of the electronic device 301 may be included in the electronic device 101 of FIG. 1.

Referring to FIG. 3, the electronic device 301 (e.g., the electronic device 101) may include a battery 310 (e.g., the battery 189), a current limiting circuit 320, a signal converting circuit 330, or an antenna 340 (e.g., the antenna module 197). In an embodiment, some of the configuration may be omitted.

In an embodiment, the battery 310 may be electrically connected to the current limiting circuit 320. In an embodiment, the battery 310 may correspond to the battery 189 of FIG. 1 or FIG. 2. In an embodiment, the antenna 340 may correspond to the antenna module 197 of FIG. 1.

In an embodiment, the current limiting circuit 320 may be electrically connected between the signal converting circuit 330 and the battery 310. In an embodiment, the current limiting circuit 320 may limit and output a current value of a signal applied to the current limiting circuit 320 below a reference current value which is set. In an embodiment, the current limiting circuit 320 may limit a current value of a direct current signal received from the battery 310 below the reference current value (e.g., 1.5 ampere (A)), and provide the direct current signal of the limited current value to the signal converting circuit 330. In embodiment, the current limiting circuit 320 may be implemented with a switch (e.g., a field-effect transistor (FET)) which opens if the current value of the direct current signal received from the battery 310 exceeds the reference current value. In an embodiment, the current limiting circuit 320 may be implemented with a current limiter which outputs the reference current value if the current value of the direct current signal received from the battery 310 exceeds the reference current value.

In an embodiment, a plurality of wireless communication techniques may include a communication technique for wireless power transmission, a communication technique for wireless power reception, a near field communication (NFC) technique, a wireless communication technique based on on-the-go (OTG), or a magnetic secure transmission (MST) technique. In an embodiment, the wireless communication techniques may be divided into first radio communication techniques for transmitting a signal from the electronic device 301 to an external electronic device 302 and second radio communication techniques for receiving a signal at the electronic device 301 from the external electronic device 302.

In an embodiment, the signal converting circuit 330 may be electrically connected between the current limiting circuit 320 and the antenna 340. In an embodiment, the signal converting circuit 330 may convert an alternate current signal inputted via the antenna 340 to a direct current signal. In an embodiment, the signal converting circuit 330 may convert the direct current signal inputted via the current limiting circuit 320 to an alternate current signal of a set frequency.

In an embodiment, in a wireless charging reception mode according to the second wireless communication technique, the signal converting circuit 330 may convert the alternate current signal received over the antenna 340 to a direct current signal and output the direct current signal to the battery 310. In an embodiment, in a wireless charging transmission mode according to the second wireless communication technique, the signal converting circuit 330 may convert the direct current signal received from the battery 310 to the alternate current signal and output the alternate current signal over the antenna 340.

In an embodiment, the signal converting circuit 330 may include four switches of a bridge structure. In an embodiment, the signal converting circuit 330 may convert the alternate current signal inputted to the signal converting circuit 330 to the direct current signal or convert the direct current signal inputted to the signal converting circuit 330 to the alternate current signal, by controlling to alternate two of the four switches of the bridge structure in a high state and a low state at set intervals, and controlling two other switches of the four switches of the bridge structure in a state, in the high state or the low state, which is different from the two switches. In an embodiment, the high state of the switch may indicate that the switch allows current flow, and the low state of the switch may indicate that the switch allows no current flow.

In an embodiment, the signal converting circuit 330 may convert the direct current signal below the reference current value to the alternate current signal for the selected communication scheme using the current limiting circuit 320, and provide the alternate current signal to the antenna 340. In an embodiment, the alternate current signal for the selected communication scheme may be a signal based on a frequency by the selected communication scheme.

In an embodiment, the antenna 340 may be electrically connected to the signal converting circuit 330. In an embodiment, the antenna 340 may have set inductance (e.g., 8 through 10 micro henry (μH) (e.g., 8.8 μH)). In an embodiment, the antenna 340 may wirelessly output (or radiate) the inputted signal to outside. In an embodiment, the antenna 340 may receive a signal wirelessly outputted (or radiated) from the external electronic device 302.

Figure 4:
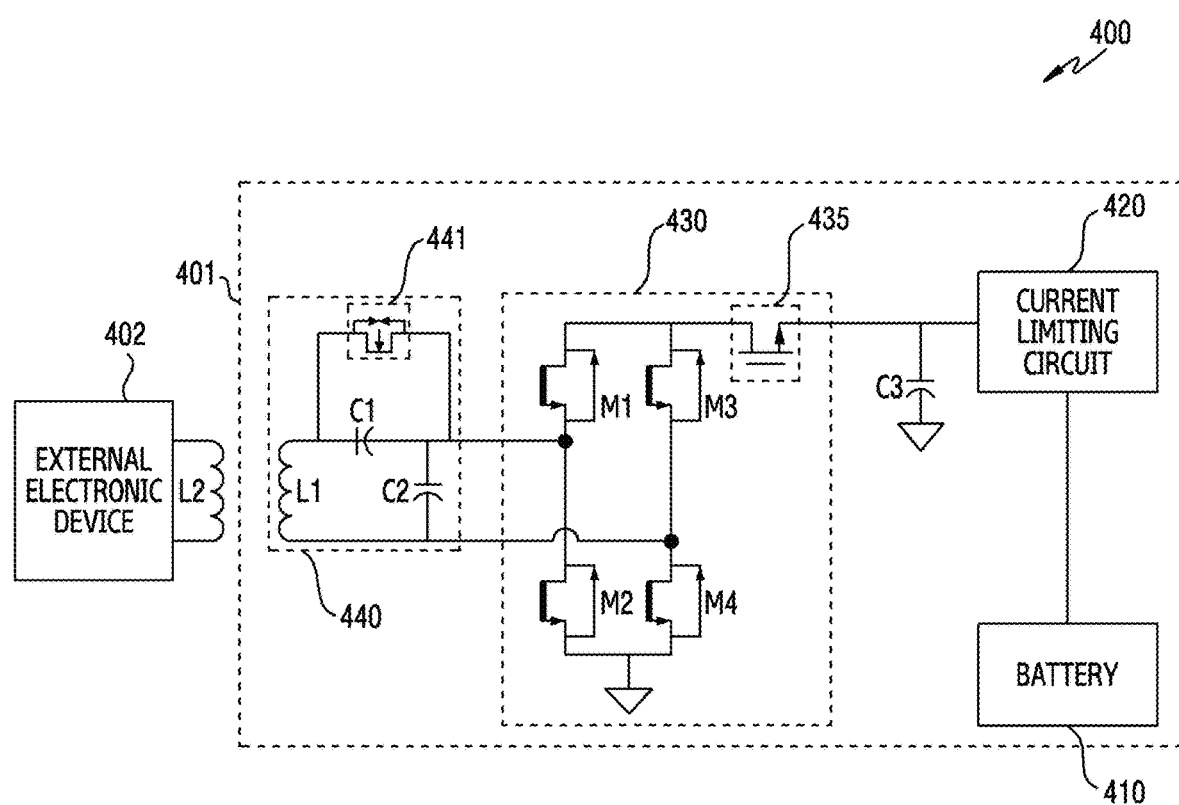
FIG. 4 illustrates a block diagram of an example of a functional configuration of an electronic device according to an embodiment.

FIG. 4 illustrates a block diagram 400 of an example of a functional configuration of an electronic device 401 according to an embodiment. The functional configuration of the electronic device 401 may be included in the electronic device 101 of FIG. 1 or the electronic device 301 of FIG. 3.

Referring to FIG. 4, the electronic device 401 may include a battery 410 (e.g., the battery 189), a current limiting circuit 420, a signal converting circuit 430, or an antenna 340 (e.g., the antenna module 197). In an embodiment, the antenna 440 may include a coil L1, a first capacitor C1, a second capacitor C2, and a first switch 441. In an embodiment, first terminals of the first capacitor C1, the second capacitor C2, and the first switch 441 of the antenna 440 may be electrically connected to a first terminal (e.g., a wire which connects switches M1 and M2) of the signal converting circuit 430, second terminals of the coil L1 and the second capacitor C2 may be electrically connected to a second terminal (e.g., a wire which connects switches M3 and M3) of the signal converting circuit 430, and the first terminal of the coil L1 may be electrically connected to the second terminals of the first capacitor C1 and the first switch 441. In an embodiment, the current limiting circuit 420 may include a third capacitor C3. In an embodiment, some of the configuration may be omitted. In an embodiment, the battery 410, the current limiting circuit 420, the signal converting circuit 430, and the antenna 440 of FIG. 4 may correspond to the battery 310, the current limiting circuit 320, the signal converting circuit 330, and the antenna 340 of FIG. 3 respectively. Descriptions on the configurations of the electronic device 401 of FIG. 4, which correspond to the configurations of the electronic device 301 of FIG. 3, may be simplified.

In an embodiment, the battery 410 may be electrically connected to the current limiting circuit 420.

In an embodiment, the current limiting circuit 420 may be electrically connected to the battery 410. In an embodiment, the current limiting circuit 420 may receive a direct current signal from the battery 410. In an embodiment, the current limiting circuit 420 may limit a current value of the direct current signal received from the battery 410 below the reference current value, and provide the direct current signal of the limited current value to the signal converting circuit 430.

In an embodiment, the signal converting circuit 430 may include four switches M1 through M4 and a low dropout regulator (LDO) 435. In an embodiment, the four switches M1 through M4 may have a bridge structure. In an embodiment, the signal converting circuit 430 may be electrically connected to the current limiting circuit 420 through the LDO 435.

In an embodiment, the signal converting circuit 430 may control the four switches M1 through M4 in the high state or the low state as shown in Table 1.

TABLE 1

|  | P1 | P2 | P3 | P4 |
|---|---|---|---|---|
| M1 | high | low | low | high |
| M2 | low | high | high | low |
| M3 | low | high | high | low |
| M4 | high | low | low | high |

Referring to Table 1, P1 through P4 may indicate time periods in which the state is maintained. In Table 1, two consecutive time periods (e.g., P1 and P2, P2 and P3, or P3 and P4) may indicate the time according to one cycle. In an embodiment, the time periods P1 through P4 may be determined based on a cycle of the selected communication scheme. In an embodiment, if the selected communication scheme uses a signal of 200 Hz, the time periods P1 through P4 may have a length of half time (1/400 second) of the cycle (1/200 second) corresponding to 200 Hz.

In an embodiment, if a current time period (e.g., P1) switches to a next time period (e.g., P2), in response to data to transmit to the external electronic device 402, the signal converting circuit 430 may control to change the state of the next time period of the four switches M1 through M4 to a state which is different from the state of the current time period, or control to have the same state as the state of the current time period.

In an embodiment, if a current time period (e.g., P1) switches to a next time period (e.g., P2), the signal converting circuit 430 may change the states of the four switches M1 through M4. In an embodiment, if two switches M1 and M4 are in the high state and two switches M2 and M3 are in the low state in the current time period (e.g., P1), the signal converting circuit 430 may change the two switches M1 and M4 into the low state and the two switches M2 and M3 into the high state, in the next time period (e.g., P2).

In an embodiment, if a current time period (e.g., P2) switches to a next time period (e.g., P3), the signal converting circuit 430 may not change the states of the four switches M1 through M4. In an embodiment, if two switches M1 and M4 are in the low state and two switches M2 and M3 are in the high state in the current time period (e.g., P2), the signal converting circuit 430 may maintain the two switches M1 and M4 in the low state and the two switches M2 and M3 in the high state, in the next time period (e.g., P3).

In an embodiment, if the signal converting circuit 430 changes the states of the four switches M1 through M4 in the next time period, to states different from the current time period, a current direction applied to a coil L1 of the antenna 440 may change. In an embodiment, if the current direction applied to the coil L1 changes, a voltage corresponding to the change of the current applied to the coil L1 may be applied to a coil L2 of the external electronic device 402. In an embodiment, if the voltage of a specific level is applied to the coil L2, the external electronic device 402 may determine that a signal of a specific value (e.g., '1') is received from the electronic device 401. In an embodiment, if the signal converting circuit 430 maintains the four switches M1 through M4 of the next time period in the same states as the current time period, the current direction applied to the coil L1 of the antenna 440 may not change. In an embodiment, if the current direction applied to the coil L1 does not change, no voltage may be applied to the coil L2 of the external electronic device 402. In an embodiment, if the voltage of the specific level is not applied to the coil L2, the external electronic device 402 may determine that a signal of a different value (e.g., '0') is received from the electronic device 401.

In Table 1, if the time period P1 switches to the time period P2, the states of the four switches M1 through M4 change, and accordingly the external electronic device 402 may interpret the value of the signal received from the electronic device 401 through the coil L2 as '1'. In Table 1, if the time period P2 switches to the time period P3, the states of the four switches M1 through M4 are maintained, and accordingly the external electronic device 402 may interpret the value of the signal received from the electronic device 401 through the coil L2 as '0'. In Table 1, if the time period P3 switches to the time period P3, the states of the four switches M1 through M4 change, and accordingly the external electronic device 402 may interpret the value of the signal received from the electronic device 401 through the coil L2 as '1'.

In an embodiment, in the time periods P1 and P4, the signal from the battery 410 may be delivered to the antenna 440 through the two switches M1 and M4. In an embodiment, in the time periods P2 and P3, the signal from the battery 410 may be delivered to the antenna 440 through the two switches M2 and M3. In an embodiment, the direction of the current delivered to the antenna 440 in the time periods P1 and P4 may be different from the current direction to the antenna 440 in the time periods P2 and P3. In an embodiment, the current may flow from a first terminal to a second terminal of the antenna 440 in the time periods P1 and P4, and the current may flow from the second terminal to the first terminal of the antenna 440 in the time periods P2 and P3.

In an embodiment, the signal converting circuit 430 may control to alternate the on state and the off state of two switches (e.g., the two switches M1 and M4 in the time periods P1 and P4, or the two switches M2 and M3 in the time periods P2 and P3) of the high state among the four switches M1 through M4 at set intervals. In an embodiment, the set interval may be shorter than the interval according to the selected communication scheme. In an embodiment, the set interval may correspond to a frequency of a megahertz (MHz).

In an embodiment, the signal converting circuit 430 may control to alternate the on state and the off state of the two switches M1 and M4 of the high state in the time period P1 among the four switches M1 through M4, at set intervals as shown in Table 2.

TABLE 2

| | P1 | | | |
|---|---|---|---|---|
| | SP1 | SP2 | SP3 | SP4 |
| M1 | ON | OFF | ON | OFF |
| M2 | OFF | OFF | OFF | OFF |
| M3 | OFF | OFF | OFF | OFF |
| M4 | ON | OFF | ON | OFF |

In Table 2, P1 indicates a time period in which two switches M1 and M4 are in the high state and two switches M2 and M3 are in the low state. In Table 2, the time period P1 may include a plurality of sub time periods SP1 through SP4.

In an embodiment, the current limiting circuit 420 and the antenna 440 may be electrically connected through two switches M1 and M4 in the sub time periods SP1 and SP3, and the current limiting circuit 420 and the antenna 440 may be electrically disconnected in the sub time periods SP2 and SP4. In an embodiment, in the sub time periods SP2 and SP4, the capacitors C1 and C2 and the coil L1 of the antenna 440 may configure a closed circuit. In an embodiment, in the sub time periods SP2 and SP4, the current may flow between the capacitors C1 and C2 and the coil L1 of the antenna 440. In an embodiment, a change (e.g., below 0.5 ampere (A)) of the current value flowing the antenna 440 between the sub time periods SP1 and SP3 and the sub time periods SP2 and SP4 in one time period P1 may be less than a change (e.g., over 1 A) of the current value flowing the antenna 440 at the switch from the current time period (e.g., P1) to a next time period (e.g., P2). In an embodiment, if the change of the current value flowing the antenna 440 between the sub time periods SP1 and SP3 and the sub time periods SP2 and SP4 in one time period P1 may be less than the change of the current value used by the wireless communication scheme. In an embodiment, the external electronic device 402 may receive a signal generated at the antenna 440 (e.g., the coil L1) through the coil L2 based on the change of the current value flowing the antenna 440 between the sub time periods SP1 and SP3 and the sub time periods SP2 and SP4 in one time period P1. In an embodiment, since the signal generated based on the change of the current value flowing the antenna 440 between the sub time periods SP1 and SP3 and the sub time periods SP2 and SP4 in one time period P1 is smaller than a signal level used by the wireless communication scheme, the external electronic device 402 may disregard the corresponding signal. In an embodiment, the corresponding signal may be interpreted and disregarded as noise at the external electronic device 402.

In an embodiment, if the signal converting circuit 430 controls to alternate the on state and the off state of two switches (e.g., M1 and M4 in the time periods P1 and P4, or M2 and M3 in the time periods P2 and P3) of the high state among the four switches M1 through M4 at set intervals, the current value outputted from the signal converting circuit 430 may be amplified. In an embodiment, the signal converting circuit 430 may generate and output the signal of the reduced voltage and the amplified current, compared with the input signal. In an embodiment, the signal converting circuit 430 may function as a switching regulator.

In an embodiment, if the communication scheme based on the MST is selected from the wireless communication techniques for transmitting a signal from the electronic device 401 to the external electronic device 402, the signal converting circuit 430 may control to alternate the on state and the off state of two switches (e.g., M1 and M4 in the time period P1, or M2 and M3 in the time period P2) of the high state at set intervals. In an embodiment, as the signal converting circuit 430 controls to alternate the on state and the off state of the two switches of the high state at the set intervals, electrical capacity used at the capacitor C3 of the current limiting circuit 420 may be further reduced. In an embodiment, the capacitor C3 may be electrically connected between the current limiting circuit 420 and the signal converting circuit 430. In an embodiment, the capacitor C3 may be connected to the ground. In an embodiment, the capacitor C3 may have a set electrical capacity (e.g., over 10 microfarad (g) (e.g., 20 μF or 30 μF). In an embodiment, the capacitor C3 may accumulate charges based on the direct current signal outputted from the current limiting circuit 420. In an embodiment, the capacitor C3 may supply the accumulated charge to the signal converting circuit 430, if the direct current signal outputted from the current limiting circuit 420 is not outputted (e.g., switched off not to output the direct current signal, if the current value of the direct current signal received at the signal converting circuit 430 from the battery 410 exceeds the reference current value).

In an embodiment, if the communication scheme based on the MST is selected from the wireless communication techniques for transmitting a signal from the electronic device 401 to the external electronic device 402, a processor (e.g., the processor 120) may control the first switch 441 in the on state to forward the current outputted from the signal converting circuit 430 to the coil L1 through the first switch 441. In an embodiment, if other communication scheme than the MST is selected from the wireless communication techniques for transmitting a signal from the electronic device 401 to the external electronic device 402, the processor (e.g., the processor 120) may control the first switch 441 in the off state to forward the current outputted from the signal converting circuit 430 to the coil L1 through the first capacitor C1.

In an embodiment, the coil L1 may receive an alternate current signal through a magnetic field generated by the coil L2 of the external electronic device 402. In an embodiment, the alternate current signal generated by the coil L1 may be provided to the signal converting circuit 430. In an embodiment, the coil L1 may produce the magnetic field, based on the alternate current signal received from the signal converting circuit 430. In various embodiments, the external electronic device 402 may receive a signal through a magnetic field generated by the coil L1 through the coil L2.

Figure 5A:
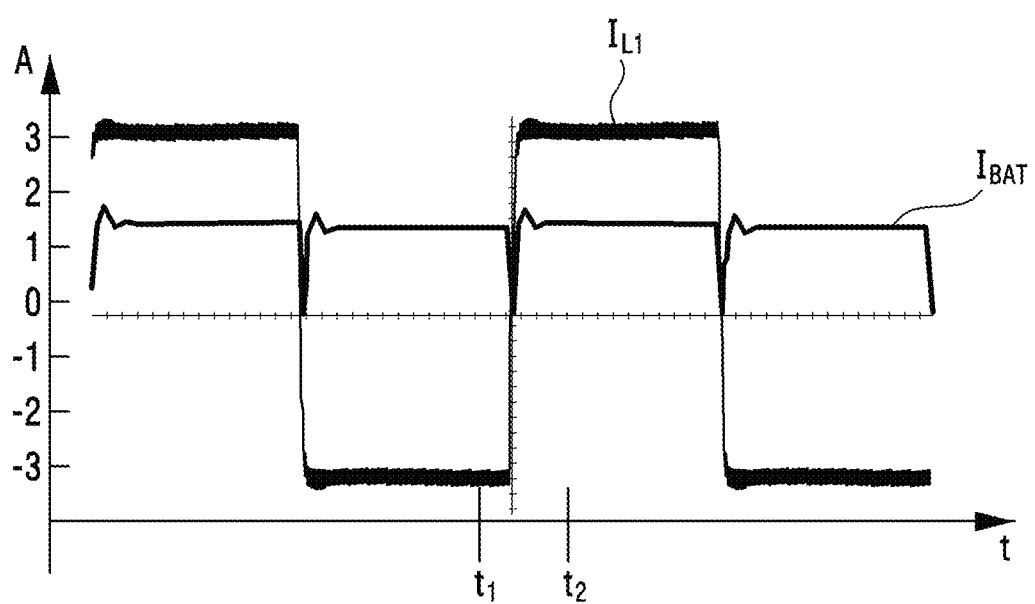
FIG. 5A illustrates a time-current graph according to operations of an electronic device according to an embodiment.
Figure 5B:
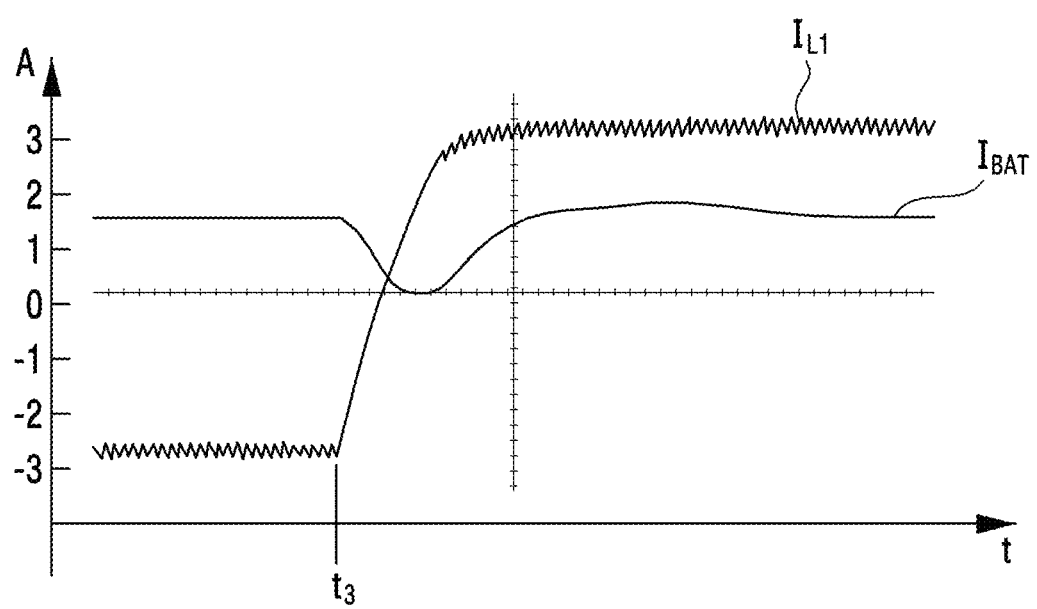
FIG. 5B illustrates a time-current graph according to the operations of the electronic device according to an embodiment.

FIG. 5A and FIG. 5B illustrate a time t-current A graph according to operations of an electronic device (e.g., the electronic device 401) according to an embodiment. FIG. 5B magnifies part (a first timing $t_1$ through a second timing $t_2$) of the time t-current A graph of FIG. 5A. FIG. 5A and FIG. 5B are explained based on the functional configuration of the electronic device 401 of FIG. 4.

Referring to FIG. 5A, the battery 410 may output a set current $I_{BAT}$. In an embodiment, the signal converting circuit 430 may control the four switches M1 through M4 in the high state or the low state, and control to alternate the on state and the off state of the two switches (e.g., M1 and M4 in the time period P1) of the high state at set intervals (e.g., the sub time periods SP1 through SP4). In an embodiment, the signal converting circuit 430 may convert the signal outputted from the battery 410 to an alternate current signal, and apply the alternate current signal to the coil L1.

Referring to FIG. 5A, the current $I_{L1}$ applied to the coil L1 may have the current value between −3 A and 3 A, through the controlling of the signal converting circuit 430 on the high state or the low state of the four switches M1 through M4. In an embodiment, if the current value $I_{L1}$ applied to the coil L1 is −3 A and the current value $I_{L1}$ applied to the coil L1 is 3 A, different current directions may be interpreted.

Referring to FIG. 5A, if the current $I_{L1}$ applied to the coil L1 changes in the direction, the circuitry of the electronic device 401 may be in a transient state. Referring to FIG. 5A, if the direction of the current $I_{L1}$ applied to the coil L1 changes, the value of the current $I_{BAT}$ outputted from the battery 410 may change. Referring to FIG. 5B, if the high state or the low state of the four switches M1 through M4 changes at a third timing $t_3$, the circuitry of the electronic device 401 may change from a steady state to the transient state. As the time passes, the circuitry of the electronic device 401 may return to the steady state. In an embodiment, if the value of the current $I_{BAT}$ outputted from the battery 410 drops (e.g., corresponds to the transient state), the charges accumulated in the current limiting circuit 420 may be supplied to the signal converting circuit 430. In an embodiment, if the value of the current $I_{BAT}$ outputted from the battery 410 lasts (e.g., corresponds to the steady state), the charges may be accumulated in the current limiting circuit 420.

Referring to FIG. 5B, since the signal converting circuit 430 controls to alternate the on state and the off state of the two switches (e.g., M1 and M4) of the high state at the set intervals, the value of the current $I_{L1}$ applied to the coil L1 may change in a designated range.

Figure 6:
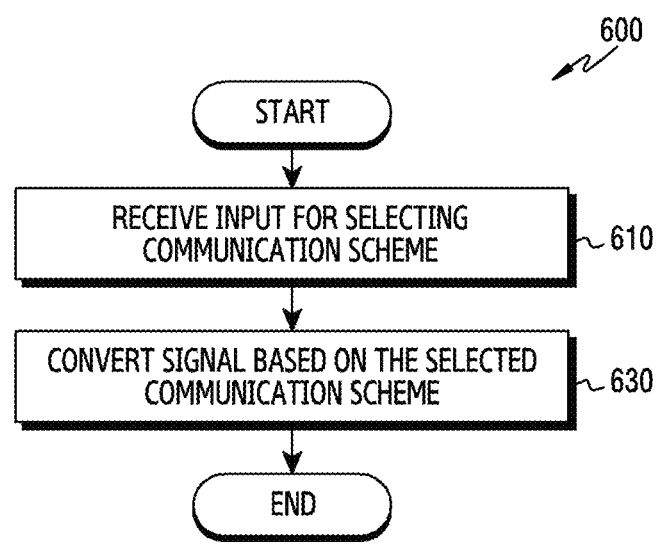
FIG. 6 illustrates a flowchart of operations of an electronic device according to an embodiment.

FIG. 6 illustrates a flowchart 600 of operations of an electronic device (e.g., the electronic device 401) according to an embodiment. FIG. 6 is described based on the functional configuration of the electronic device 401 of FIG. 4.

Referring to FIG. 6, in operation 610, the processor (e.g., the processor 120) of the electronic device 401 may receive an input which selects a communication scheme. In an embodiment, the processor 120 of the electronic device 401 may receive the input which selects a first communication scheme from a plurality of communication schemes. In an embodiment, the input which selects the first communication scheme may be a user's touch input to an object of a user interface of an application which is displayed on a display (e.g., the display device 160). In an embodiment, the plurality of the communication schemes may be used by the electronic device 401 to transmit and receive radio communication signals corresponding to a plurality of wireless communication techniques to and from the external electronic device 402. In an embodiment, the plurality of the wireless communication schemes may include a communication technique for wireless power transmission, a communication technique for wireless power reception, an NFC technique, or a method according to MST.

In operation 630, the processor may control to convert a signal based on the selected communication scheme through the signal converting circuit 430.

In an embodiment, if the selected communication scheme is the first communication scheme, the signal converting circuit 430 may convert a direct current signal from the battery 410 to an alternate current signal for the first communication scheme, and provide the converted alternate current signal to the coil L1. In an embodiment, the alternate current signal for the first communication scheme may have a frequency by the first communication scheme. In an embodiment, the first communication scheme may indicate a communication scheme for the electronic device 401 to transmit a signal to the external electronic device 402. For example, the first communication scheme may include the communication technique for the wireless power transmission, the NFC technique, or the MST technique.

In an embodiment, if the selected communication scheme is the first communication scheme, while converting the direct current signal from the battery 410 to the alternate current signal and providing the converted alternate current signal to the coil L1 of the antenna 440, the signal converting circuit 430 may control to alternate the first and fourth switches M1 and M4 in the high state and the low state at intervals according to the first communication scheme. In an embodiment, while converting the direct current signal outputted from the battery 410 to the alternate current signal and providing the converted alternate current signal to the coil L1 of the antenna 440, the signal converting circuit 430 may control the second and third switches M2 and M3 in a different state, which is the high state or the low state, from the first and fourth switches M1 and M4. In an embodiment, while converting the direct current signal outputted from the battery 410 to the alternate current signal and providing the converted alternate current signal to the coil L1 of the antenna 440, the signal converting circuit 430 may control to alternate two switches (e.g., M1 and M4, or M2 and M3) of the high state among the first through fourth switches M1 through M4, in the on state and the off state at designated intervals.

In an embodiment, if the selected communication scheme is the second communication scheme, the signal converting circuit 430 may convert the alternate current signal from the coil L1 to the direct current signal for the second communication scheme, and provide the converted direct current signal to the battery 410. In an embodiment, the second communication scheme may indicate a communication scheme for receiving a signal from the external electronic device 402. For example, the second communication scheme may include the communication technique for the wireless power reception, the NFC technique, or the MST technique.

In an embodiment, if the selected communication scheme is the second communication scheme, while converting the alternate current signal from the coil L1 of the antenna 440 to the direct current signal and providing the converted direct current signal to the battery 410, the signal converting circuit 430 may control to alternate the first and fourth switches M1 and M4 in the high state and the low state at intervals according to the second communication scheme. In an embodiment, while converting the alternate current signal outputted from the coil L1 of the antenna 440 to the direct current signal and providing the converted direct current signal to the battery 410, the signal converting circuit 430 may control the second and third switches M2 and M3 in a different state, which is the high state or the low state, from the first and fourth switches M1 and M4. In an embodiment, while converting the alternate current signal outputted from the coil L1 of the antenna 440 to the direct current signal and providing the converted direct current signal to the battery 410, the signal converting circuit 430 may control to maintain two switches (e.g., M1 and M4, or M2 and M3) of the high state among the first through fourth switches M1 through M4, in the on state.

Figure 7:
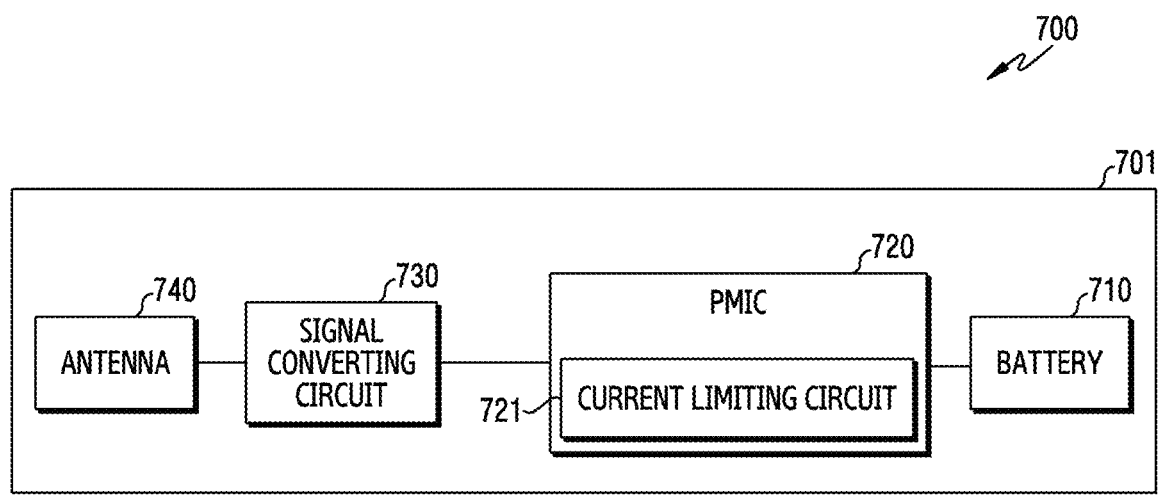
FIG. 7 illustrates a block diagram of an example of a functional configuration of an electronic device according to an embodiment.

FIG. 7 illustrates a block diagram 700 of an example of a functional configuration of an electronic device 701 according to an embodiment. The functional configuration of the electronic device 701 may be included in the electronic device 101 of FIG. 1, the electronic device 301 of FIG. 3, or the electronic device 401 of FIG. 4.

Referring to FIG. 7, the electronic device 701 may include a battery 710 (e.g., the battery 189), a power management integrated circuit (PMIC) 720, a signal converting circuit 730, or an antenna 740 (e.g., the antenna module 197). In an embodiment, some of the configuration may be omitted. In an embodiment, the battery 710, the signal converting circuit 730, and the antenna 740 of FIG. 7 may correspond to the battery 310, the signal converting circuit 330, and the antenna 340 of FIG. 3 respectively. In an embodiment, the battery 710, the signal converting circuit 730, and the antenna 740 of FIG. 7 may correspond to the battery 410, the signal converting circuit 430, and the antenna 440 of FIG. 4 respectively. Descriptions on the configuration of the electronic device 701 of FIG. 7, which corresponds to the configuration of the electronic device 301 of FIG. 3 or the configuration of the electronic device 401 of FIG. 4, may be simplified.

In an embodiment, the PMIC 720 may be interposed between the battery 710 and the signal converting circuit 730, and may be electrically connected to the battery 710 and the signal converting circuit 730. In an embodiment, the PMIC 720 may adjust and provide voltage or current of an input signal to the battery 710 or the signal converting circuit 730.

In an embodiment, if delivering the input signal to the battery 710, the PMIC 720 may adjust the voltage, the current, or their combination of the signal inputted from the signal converting circuit 730 according to power output information of the battery 710 (e.g., adjust the voltage, the current, or their combination according to battery information (e.g., battery voltage)), and provide the battery 710 with the signal of the adjusted voltage, the current, or combination thereof.

In an embodiment, if adjusting and providing the voltage of the input signal to the signal converting circuit 730, the PMIC 720 may adjust the voltage, the current, or their combination of the signal inputted from the battery 710 according to power output information which is set for the signal converting circuit 730, and provide the signal of the controlled voltage, current, or combination thereof to the signal converting circuit 730.

In an embodiment, if the electronic device 701 wirelessly communicates with an external electronic device (e.g., the external electronic device 402), based on one of the wireless communication schemes according to the first wireless communication techniques of the wireless communication techniques, the PMIC 720 may adjust the voltage, the current, or their combination of the signal inputted from the battery 710 according to the power output information by the one communication scheme, and provide the signal of the controlled voltage, current, or combination thereof to the signal converting circuit 730. In an embodiment, the electronic device 701 may transmit the signal fed to the signal converting circuit 730 to the external electronic device (e.g., the external electronic device 402 of FIG. 4) over the antenna 740.

In an embodiment, the PMIC 720 includes a current limiting circuit 721, and may adjust the current of the signal inputted from the battery 710 below the reference current value, using the current limiting circuit 721. In an embodiment, the current limiting circuit 721 of FIG. 7 may correspond to the current limiting circuit 320 of FIG. 3. In an embodiment, the current limiting circuit 721 of FIG. 7 may correspond to the current limiting circuit 420 of FIG. 4.

Figure 8:
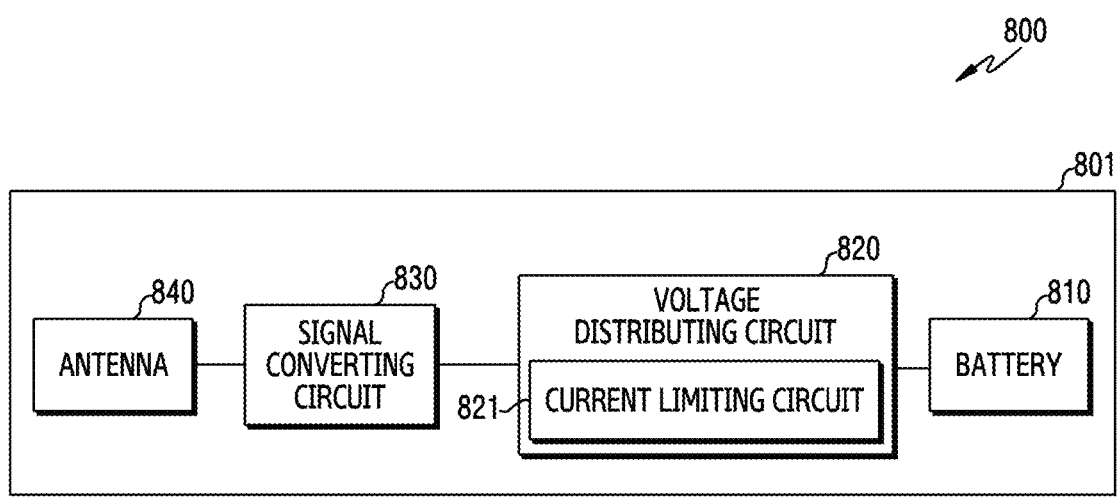
FIG. 8 illustrates a block diagram of an example of a functional configuration of an electronic device according to an embodiment.

FIG. 8 illustrates a block diagram 800 of an example of a functional configuration of an electronic device 801 according to an embodiment. The functional configuration of the electronic device 801 may be included in the electronic device 101 of FIG. 1, the electronic device 301 of FIG. 3, or the electronic device 401 of FIG. 4.

Referring to FIG. 8, the electronic device 801 may include a battery 810 (e.g., the battery 189), a power distributing circuit 820, a signal converting circuit 830, or an antenna 840 (e.g., the antenna module 197). In an embodiment, some of the configuration may be omitted. In an embodiment, the battery 810, the signal converting circuit 830, and the antenna 840 of FIG. 8 may correspond to the battery 310, the signal converting circuit 330, and the antenna 340 of FIG. 3 respectively. In an embodiment, the battery 810, the signal converting circuit 830, and the antenna 840 of FIG. 8 may correspond to the battery 410, the signal converting circuit 430, and the antenna 440 of FIG. 4 respectively. Descriptions on the configurations of the electronic device 801 of FIG. 8, which correspond to the configurations of the electronic device 301 of FIG. 3 or the electronic device 401 of FIG. 4, may be simplified.

In an embodiment, the power distributing circuit 820 may be interposed between the battery 810 and the signal converting circuit 830, and may be electrically connected to the battery 810 and the signal converting circuit 830. In an embodiment, the power distributing circuit 820 may adjust and provide to the battery 810 or the signal converting circuit 730, voltage or current of an input signal according to a set distribution ratio. In an embodiment, if the set distribution ratio of the power distributing circuit 820 is 2:1, the power distributing circuit 820 may halve the voltage of the signal inputted from the signal converting circuit 830, double the current, and then provide the signal to the signal converting circuit 830. In an embodiment, if the set distribution ratio of the power distributing circuit 820 is 2:1, the power distributing circuit 820 may double the voltage of the signal inputted from the battery 810, halve the current, and then provide the signal to the signal converting circuit 830.

In an embodiment, the power distributing circuit 820 may provide a bypass path which outputs the signal without adjusting the voltage or the current of the input signal according to the set distribution ratio. In an embodiment, the power distributing circuit 820 may include a current limiting circuit 821 on the bypass path. In an embodiment, the current limiting circuit 821 of FIG. 8 may correspond to the current limiting circuit 320 of FIG. 3. In an embodiment, the current limiting circuit 821 of FIG. 8 may correspond to the current limiting circuit 420 of FIG. 4.

In an embodiment, based on power output information used by one of the wireless communication schemes according to the first wireless communication technique of the wireless communication techniques, the power distributing circuit 820 may process the input signal by selecting one of a path which adjusts the voltage or the current of the input signal according to the set distribution ratio, or the bypass path. In an embodiment, the communication scheme requiring the path which adjusts the voltage or the current of the input signal according to the set distribution ratio may include the communication scheme for the wireless power transmission, the communication scheme for the wireless power reception, or the wireless communication scheme based on the OTG. In an embodiment, the communication scheme requiring the bypass path may be the communication scheme based on the MST.

In an embodiment, if one of the wireless communication schemes according to the first wireless communication technique of the wireless communication techniques is the communication scheme based on the MST, the power distributing circuit 820 may adjust the current of the signal inputted from the battery 810 below the reference current value, using the current limiting circuit 821.

Figure 9:
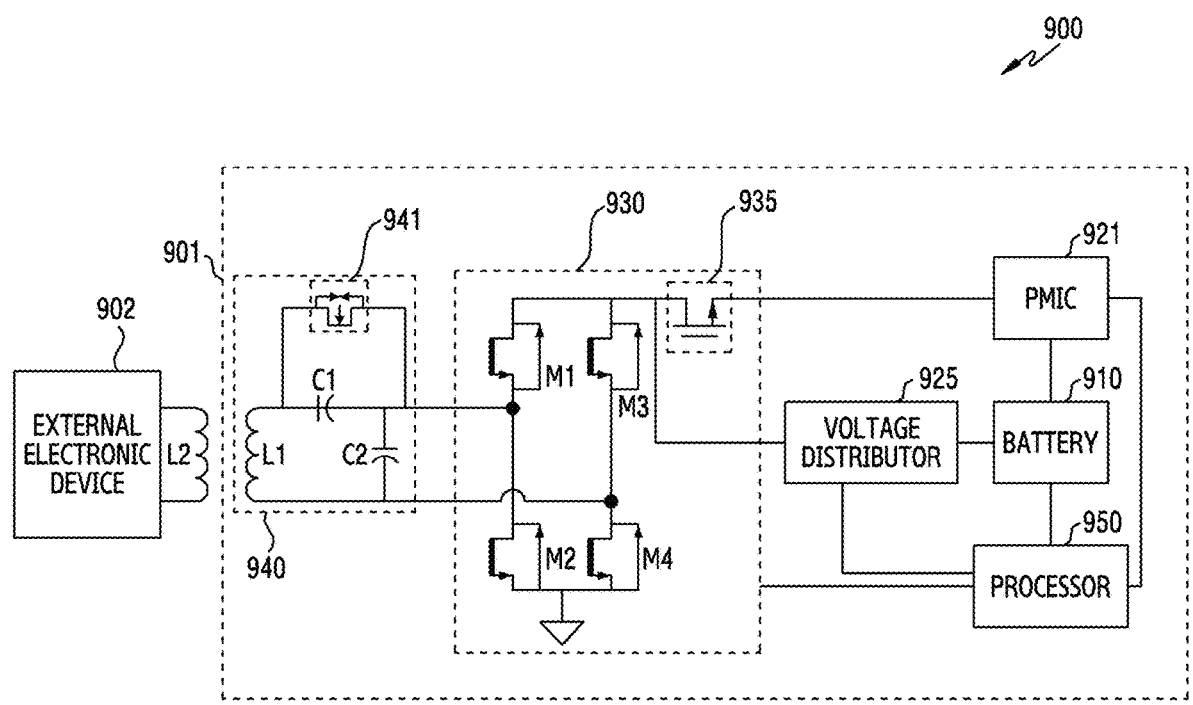
FIG. 9 illustrates a diagram of an example of a functional configuration of an electronic device according to an embodiment.

FIG. 9 illustrates a block diagram 900 of an example of a functional configuration of an electronic device 901 according to an embodiment. The functional configuration of the electronic device 901 may be included in the electronic device 101 of FIG. 1, the electronic device 301 of FIG. 3, or the electronic device 401 of FIG. 4.

Referring to FIG. 9, the electronic device 901 may include a battery 910 (e.g., the battery 189), a PMIC 921, a voltage distributor 925, a signal converting circuit 930, an antenna 940 (e.g., the antenna module 197), or a processor 950 (e.g., the processor 120). In an embodiment, some of the configuration may be omitted. In various embodiments, the signal converting circuit 930 may include four switches M1 through M4, or an LDO 935. In various embodiments, the antenna 940 may include a first switch 941, a first capacitor C1, or a second capacitor C2. In an embodiment, first terminals of the first capacitor C1, the second capacitor C2, and a switch 941 of the antenna 940 may be electrically connected to a first terminal (e.g., a wire which connects the switches M1 and M2) of the signal converting circuit 930, second terminals of the coil L1 and the second capacitor C2 may be electrically connected to a second terminal (e.g., a wire which connects the switches M3 and M4) of the signal converting circuit 930, and the first terminal of the coil L1 may be electrically connected to the second terminals of the first capacitor C1 and the switch 941. In an embodiment, some of the configuration may be omitted.

In an embodiment, the battery 910, the signal converting circuit 930, and the antenna 940 of FIG. 9 may correspond to the battery 310, the signal converting circuit 330, and the antenna 340 of FIG. 3 respectively. In an embodiment, the battery 910, the signal converting circuit 930, and the antenna 940 of FIG. 9 may correspond to the battery 410, the signal converting circuit 430, and the antenna 440 of FIG. 4 respectively. In an embodiment, the PMIC 921 of FIG. 9 may correspond to the PMIC 720 of FIG. 7. In an embodiment, the power distributor 925 of FIG. 9 may correspond to the power distributing circuit 820 of FIG. 8. In an embodiment, the processor 950 of FIG. 9 may correspond to the processor 120 of FIG. 1. In an embodiment, the coil L1, the first switch 941, the first capacitor C1, and the second capacitor C2 of FIG. 9 may correspond to the coil L1, the first switch 441, the first capacitor C1, and the second capacitor C2 of FIG. 4.

Descriptions on the configurations of the electronic device 901 of FIG. 9, which correspond to the configurations of the electronic device 301, 401, 701, and 801 of FIG. 3, FIG. 4, FIG. 7 and FIG. 8, may be simplified.

In an embodiment, the PMIC 921 may integrally include a current limiting circuit (e.g., the current limiting circuit 320 of FIG. 3, or the current limiting circuit 420 of FIG. 4). In an embodiment, the PMIC 921 and the signal converting circuit 930 may be electrically connected through a current limiting circuit (e.g., the current limiting circuit 320 or the current limiting circuit 420).

In an embodiment, the voltage distributor 925 may integrally include the current limiting circuit (e.g., the current limiting circuit 320 or the current limiting circuit 420). In an embodiment, the voltage distributor 925 and the signal converting circuit 930 may be electrically connected through the current limiting circuit (e.g., the current limiting circuit 320 or the current limiting circuit 420).

In an embodiment, the processor 950 may form a signaling path from the battery 910 to the antenna 940, for the wireless communication according to the first wireless communication scheme. In an embodiment, the processor 950 may control to transmit a signal outputted from the battery 910 to an external electronic device 902 through the voltage distributor 925, the signal converting circuit 930, and the antenna 940. In an embodiment, the processor 950 may control to transmit a signal outputted from the battery 910 to the external electronic device 902 through the PMIC 921, the signal converting circuit 930, and the antenna 940. In an embodiment, the first wireless communication scheme may include the communication scheme for the wireless power transmission, the NFC (transmission), the wireless communication scheme (transmission) based on the OTG, or the MST (transmission).

In an embodiment, the processor 950 may generate a user interface (UI), and display the UI on a display device (e.g., the display device 160 of FIG. 1). In an embodiment, the processor 950 may generate a UI allowing the user to select at least one of the various communication techniques.

In an embodiment, based on a user input (e.g., at least one of a touch input or a drag input) inputted through the UI displayed on the display device (e.g., the display device 160 of FIG. 1), the processor 950 may form a signaling path from the battery 910 to the antenna 940, for the wireless communication according to at least one of the various communication techniques.

In an embodiment, the processor 950 may form a signaling path from the antenna 940 to the battery 910, for the wireless communication according to the second wireless communication scheme. In an embodiment, the processor 950 may forward to the battery 910 or receive a signal received from the external electronic device 902 over the antenna 940 through the signal converting circuit 930 and the voltage distributor 925. In an embodiment, the second wireless communication scheme may include the communication scheme for the wireless power transmission, the NFC (reception), the wireless communication scheme (reception) based on the OTG, or the MST (reception).

In an embodiment, to communicate with the external electronic device 902 using the communication scheme based on the MST, the processor 950 may control the signal converting circuit 930 to include a signal radiated to outside over the antenna 940 into payment information such as card information. In an embodiment, to communicate with the external electronic device 902 using the communication scheme based on the MST, the processor 950 may control a current limiting circuit (e.g., the current limiting circuit 320) to make a current value applied to the antenna 940 a current value which is set based on the communication scheme based on the MST.

As set forth above, an electronic device (e.g., the electronic device 401) and its operating method according to an embodiment may differently control a signal converting circuit (e.g., the signal converting circuit 330) according to the selected communication scheme to generate a signal according to the selected communication scheme using a single antenna (e.g., the antenna 440), thus providing a plurality of communication schemes.

As set forth above, an electronic device (e.g., the electronic device 401) and its operating method according to an embodiment may reduce a mounting area of a coil, by providing a plurality of communication schemes using a single antenna (e.g., the antenna 440). In addition, an electronic device (e.g., the electronic device 401) and its operating method according to an embodiment may reduce a manufacturing cost of the electronic device, by providing a plurality of communication schemes using a single antenna (e.g., the antenna 440).

An electronic device according to an embodiment may include a battery 310, a signal converting circuit 330 electrically connected to the battery 310, transmitting and receiving a direct current signal to and from the battery, and including first, second, third, and fourth switches of a bridge structure, a processor electrically connected to the signal converting circuit, and an antenna 340 electrically connected to the signal converting circuit, transmitting and receiving an alternate current signal to and from the signal converting circuit, and supporting a plurality of communication schemes, wherein the signal converting circuit 330 may be configured to receive from the processor, an input which selects a first communication scheme from the plurality of the communication schemes, based on the received input, while converting and providing to the antenna, a direct current signal outputted from the battery 310 to an alternate current signal, control to alternate the first and fourth switches in a high state and a low state at intervals according to the first communication scheme, control the second and third switches in a different state, which is the high state or the low state, from the state of the first and fourth switches, and control to alternate two of the first, second, third, and fourth switches, the two of the high state, in an on state and an off state at designated intervals.

In an embodiment, based on an input which selects a second communication scheme from the plurality of the communication schemes, while converting and providing to the battery, an alternate current signal outputted from the antenna to a direct current signal, the signal converting circuit 330 may configured to control to alternate the first and fourth switches in the high state and the low state at intervals according to the second communication scheme, and control the second and third switches in a different state, which is the high state or the low state, from the state of the first and fourth switches.

In an embodiment, the second communication scheme may conform to a wireless charging technique.

In an embodiment, the antenna 340 may include a coil for forming a magnetic field corresponding to an applied alternate current signal.

In an embodiment, the electronic device may further include a current limiting circuit 320 electrically connected to the battery 310, and limiting and output to the signal converting circuit 330, a current value of the signal outputted from the battery 310 below a reference current value.

In an embodiment, the electronic device may further include a power distributing circuit 820 electrically connected to the battery 310, and adjusting and outputting a voltage value of power supplied from the battery 310 according to a set ratio, wherein, based on the communication scheme selected from the plurality of the communication schemes, the signal converting circuit 330 may be electrically connected to the battery 310 through one of the power distributing circuit 820 or the current limiting circuit 320.

In an embodiment, the electronic device may further include a power management integrated circuit electrically connected to the battery 310, and adjusting and outputting to the signal converting circuit 330, a voltage value, a current value, or their combination of power supplied from the battery 310.

In an embodiment, the first communication scheme may output a radio signal according to an MST technique.

In an embodiment, the plurality of the communication schemes may include a communication scheme based on MST, a communication scheme based on a wireless charging technique, a wireless communication scheme based on OTG, or a combination thereof.

An electronic device according to an embodiment may include a display 160, a battery 310, a signal converting circuit 330 electrically connected to the battery 310, transmitting and receiving a direct current signal to and from the battery 310, and including first, second, third, and fourth switches of a bridge structure, an antenna 340 electrically connected to the signal converting circuit 330, transmitting and receiving an alternate current signal to and from the signal converting circuit 330, and supporting a plurality of communication schemes, and a processor 120 electrically connected to the display 160, the battery 310, the signal converting circuit 330 and the antenna 340, wherein the processor 120 may be configured to display a user interface for selecting at least one of the plurality of the communication schemes on the display 160, identify a user input of a region in which the user interface is displayed, identify a communication scheme corresponding to the identified user input among the plurality of the communication schemes, if the communication scheme corresponding to the identified user input is a first communication scheme, control to alternate the first and fourth switches of the signal converting circuit 330 in a high state and a low state at intervals according to the first communication scheme, while converting and providing to the antenna 340 a direct current signal outputted from the battery to an alternate current signal, control the second and third switches of the signal converting circuit 330 in a different state, which is the high state or the low state, from the state of the first and fourth switches, and control to alternate two of the first, second, third, and fourth switches of the signal converting circuit 330, the two in the high state, in an on state and an off state at designated intervals.

In an embodiment, the first communication scheme may output a radio signal according to an MST technique.

In an embodiment, if the communication scheme corresponding to the identified user input is a second communication scheme, the processor 120 may be configured to control to alternate the first and fourth switches in the high state and the low state at intervals according to the second communication scheme, and controls the second and third switches in a different state, which is the high state or the low state, from the state of the first and fourth switches.

In an embodiment, the second communication scheme may conform to a wireless charging technique.

An operating method of an electronic device according to an embodiment may include receiving, at a processor 120 of the electronic device, an input which selects a first communication scheme from a plurality of communication schemes, and based on the input which selects the first communication scheme from the plurality of the communication schemes, converting and providing, at a signal converting circuit 330 including first, second, third, and fourth switches of a bridge structure of the electronic device, to an antenna 340 of the electronic device, a direct current signal outputted from a battery 310 of the electronic device to an alternate current signal, wherein converting and providing to the antenna 340 of the electronic device, the direct current signal outputted from the battery 310 of the electronic device to the alternate current signal may include controlling, at the signal converting circuit 330, to alternate the first and fourth switches in a high state and a low state at intervals according to the first communication scheme, controlling, at the signal converting circuit 330, the second and third switches in a different state, which is the high state or the low state, from the state of the first and fourth switches, and controlling, at the signal converting circuit 330, to alternate two of the first, second, third, and fourth switches, the two in the high state, in an on state and an off state at designated intervals.

In an embodiment, the operating method may further include receiving, at the processor 120 of the electronic device, an input which selects a second communication scheme from the plurality of the communication schemes, and based on the input which selects the second communication scheme from the plurality of the communication schemes, converting and providing, at the signal converting circuit 330, to the battery 310, an alternate current signal outputted from the antenna to a direct current signal, wherein converting and providing to the battery 310 the alternate current signal outputted from the antenna 340 to the direct current signal may include controlling to alternate the first and fourth switches in the high state and the low state at intervals according to the second communication scheme, and controlling the second and third switches in a different state, which is the high state or the low state, from the state of the first and fourth switches.

In an embodiment, the second communication scheme may conform to a wireless charging technique.

In an embodiment, the antenna 340 may include a coil for forming a magnetic field corresponding to an applied alternate current signal.

In an embodiment, the operating method may further include limiting and outputting, at a current limiting circuit 320 of the electronic device electrically connected between the battery 310 and the signal converting circuit 330, a current value of a signal outputted from the battery 310 below a reference current value, to the signal converting circuit 330.

In an embodiment, the first communication scheme may output a radio signal according to an MST technique.

In an embodiment, the plurality of the communication schemes may include a communication scheme based on MST, a communication scheme based on a wireless charging technique, a wireless communication scheme based on OTG, or a combination thereof.

An electronic device and its method according to an embodiment may differently control a signal converting circuit according to a selected communication scheme to generate a signal according to the selected communication scheme using a single antenna, thus providing a plurality of communication schemes.

Methods according to various example embodiments of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The one or more program may include instructions that cause the electronic device to perform the methods according to an embodiment of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Any combination of some or all of them may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described example embodiments of the present disclosure, a component included in the present disclosure is expressed in the singular or the plural according to a presented example embodiment. However, the singular form or plural form is selected for convenience of description suitable for the presented situation, and various example embodiments of the present disclosure are not limited to a single element or multiple elements thereof. Further, either multiple elements expressed in the description may be configured into a single element or a single element in the description may be configured into multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a battery;
   a signal converting circuit electrically connected to the battery, the signal converting circuit configured to transmit and receive a direct current signal to and from the battery, the signal converting circuit comprising first, second, third, and fourth switches of a bridge structure;
   a processor electrically connected to the signal converting circuit; and
   an antenna electrically connected to the signal converting circuit, the antenna configured to transmit and receive an alternate current signal to and from the signal converting circuit, the antenna supporting a plurality of communication schemes by transmitting and receiving wireless signals of at least one of the plurality of the communication schemes,
   wherein the signal converting circuit is configured to:
      select a first communication scheme from the plurality of the communication schemes by controlling of the processor, and
      based on the selection of the first communication scheme, while converting the direct current signal received from the battery to the alternate current signal and providing the alternate current signal to the antenna:
         control the first and fourth switches to alternate in a high state and a low state at intervals according to the first communication scheme,
         control the second and third switches in a different state, the different state being the high state or the low state and different from the state of the first and fourth switches, and
         control two of the first, second, third, and fourth switches in the high state to alternate in an on state and an off state at designated intervals.

2. The electronic device of claim 1, wherein, based on selection of a second communication scheme from the plurality of the communication schemes, while converting the direct current signal received from the battery to the alternate current signal and providing the alternate current signal to the antenna, the signal converting circuit is further configured to:
   control the first and fourth switches to alternate in the high state and the low state at intervals according to the second communication scheme; and
   control the second and third switches in a different state, the different state being the high state or the low state and different from the state of the first and fourth switches.

3. The electronic device of claim 2, wherein the second communication scheme conforms to a wireless charging technique.

4. The electronic device of claim 1, wherein the antenna comprises a coil for forming a magnetic field corresponding to an applied alternate current signal.

5. The electronic device of claim 1, further comprising a current limiting circuit electrically connected to the battery, the current limiting circuit configured to limit and output a current value of a signal outputted from the battery below a reference current value to the signal converting circuit.

6. The electronic device of claim 5, further comprising:
   a voltage distributing circuit electrically connected to the battery, the voltage distributing circuit configured to adjust and output a voltage value of power supplied from the battery according to a set ratio,
   wherein, based on the first communication scheme selected from the plurality of the communication schemes, the signal converting circuit is electrically connected to the battery through one of the voltage distributing circuit or the current limiting circuit.

7. The electronic device of claim 1, further comprising a power management integrated circuit electrically connected to the battery, the power management integrated circuit configured to adjust and output a voltage value, a current value, or their combination of power supplied from the battery to the signal converting circuit.

8. The electronic device of claim 1, wherein the first communication scheme outputs a radio signal according to a magnetic secure transmission (MST) technique.

9. The electronic device of claim 1, wherein the plurality of the communication schemes comprises a communication scheme based on MST, a communication scheme based on a wireless charging technique, a wireless communication scheme based on on-the-go (OTG), or a combination thereof.

10. An electronic device comprising:
    a display;
    a battery;
    a signal converting circuit electrically connected to the battery, the signal converting circuit configured to transmit and receive a direct current signal to and from the battery, the signal converting circuit comprising first, second, third, and fourth switches of a bridge structure;
    an antenna electrically connected to the signal converting circuit, the antenna configured to transmit and receive an alternate current signal to and from the signal converting circuit, the antenna supporting a plurality of communication schemes by transmitting and receiving wireless signals of at least one of the plurality of the communication schemes; and a processor electrically connected to the display, the battery, the signal converting circuit, and the antenna, wherein the processor is configured to:
control the display to display a user interface for selecting at least one of the plurality of the communication schemes,
identify a user input to a region of the display in which the user interface is displayed,
identify a communication scheme corresponding to the identified user input among the plurality of the communication schemes, and
based on the identified communication scheme corresponding to the identified user input being a first communication scheme:
control the first and fourth switches of the signal converting circuit to alternate in a high state and a low state at intervals according to the first communication scheme while converting the direct current signal received from the battery to the alternate current signal and providing the alternate current signal to the antenna,
control the second and third switches of the signal converting circuit in a different state, the different state being the high state or the low state and different from the state of the first and fourth switches, and
control two of the first, second, third, and fourth switches of the signal converting circuit in the high state to alternate in an on state and an off state at designated intervals.

11. The electronic device of claim 10, wherein the first communication scheme outputs a radio signal according to a magnetic secure transmission (MST) technique.

12. The electronic device of claim 10, wherein, based on the communication scheme corresponding to the identified user input being a second communication scheme, the processor is further configured to:
control the first and fourth switches to alternate in the high state and the low state at intervals according to the second communication scheme; and
control the second and third switches in a different state, the different state being the high state or the low state and different from the state of the first and fourth switches.

13. The electronic device of claim 12, wherein the second communication scheme conforms to a wireless charging technique.

14. An operating method of an electronic device, comprising:
selecting a first communication scheme from a plurality of communication schemes by controlling of a processor of the electronic device; and
based on the selection of the first communication scheme from the plurality of the communication schemes, converting a direct current signal outputted from a battery of the electronic device to an alternate current signal at a signal converting circuit comprising first, second, third, and fourth switches of a bridge structure of the electronic device and providing the alternate current signal to an antenna of the electronic device,
wherein converting the direct current signal outputted from the battery of the electronic device to the alternate current signal and providing the alternate current signal to the antenna of the electronic device comprises:
controlling, at the signal converting circuit, the first and fourth switches to alternate in a high state and a low state at intervals according to the first communication scheme;
controlling, at the signal converting circuit, the second and third switches in a different state, the different state being the high state or the low state and different from the state of the first and fourth switches; and
controlling, at the signal converting circuit, two of the first, second, third, and fourth switches in the high state to alternate in an on state and an off state at designated intervals.

15. The operating method of claim 14, further comprising:
selecting a second communication scheme from the plurality of the communication schemes by controlling of the processor; and
based on the selecting of the second communication scheme from the plurality of the communication schemes, converting, at the signal converting circuit, an alternate current signal outputted from the antenna to a direct current signal and providing the direct current signal to the battery,
wherein converting the alternate current signal outputted from the antenna to the direct current signal and providing the direct current signal to the battery comprises:
controlling the first and fourth switches to alternate in the high state and the low state at intervals according to the second communication scheme, and
controlling the second and third switches in a different state, the different state being the high state or the low state and different from the state of the first and fourth switches.

16. The operating method of claim 15, wherein the second communication scheme conforms to a wireless charging technique.

17. The operating method of claim 14, wherein the antenna comprises a coil for forming a magnetic field corresponding to an applied alternate current signal.

18. The operating method of claim 14, further comprising limiting and outputting, at a current limiting circuit of the electronic device electrically connected between the battery and the signal converting circuit, a current value of a signal output from the battery below a reference current value, to the signal converting circuit.

19. The operating method of claim 14, wherein the first communication scheme outputs a radio signal according to a magnetic secure transmission (MST) technique.

20. The operating method of claim 14, wherein the plurality of the communication schemes comprises a communication scheme based on MST, a communication scheme based on a wireless charging technique, a wireless communication scheme based on on-the-go (OTG), or a combination thereof.

* * * * *